Jan. 17, 1967 E. O. SCHWEITZER, JR 3,299,405

SIGNALLING SYSTEM

Filed Jan. 4, 1963 2 Sheets-Sheet 1

INVENTOR.
Edmund O. Schweitzer, Jr.,
BY
Robert R. Lockwood
Atty.

United States Patent Office 3,299,405

Patented Jan. 17, 1967

3,299,405

SIGNALLING SYSTEM

Edmund O. Schweitzer, Jr., 1002 Dundee Road, Northbrook, Ill. 60062

Filed Jan. 4, 1963, Ser. No. 249,527
9 Claims. (Cl. 340—170)

This invention relates, generally, to signalling systems and it has particular relation to such systems for use in connection with telephone and radio circuits. It constitutes an improvement over the systems disclosed in my U.S. Patent Nos. 3,004,381 and 3,005,134, both issued October 17, 1961.

It is conventional to construct various types of buildings, such as office buildings, stores, manufacturing and cold storage plants and the like, with equipment that operates automatically for maintaining certain conditions therein such as temperature, humidity, and the like. Also it is conventional in such buildings to provide fire detecting equipment, signals indicating that doors and windows have been opened by unauthorized personnel and other similar indications. Usually more than one building is involved and it is desirable to monitor continuously from a central point, herein called a second station, the conditions existing in one or several outlying buildings or establishments. At the central location it is economically feasible to provide personnel on a 24 hour a day basis. When an appropriate signal is displayed at the central office or second station corresponding to a change in equipment at an outlying building, herein called a first station, the operator is advised as to the nature of the change and is in a position to determine whether it is necessary to take prompt action, as in the case of a fire, or whether the change is such that some time can elapse before any action is taken. An example of the latter is in the shutting down of an air conditioning system which ordinarily would not require immediate attention.

Ordinarily such outlying buildings or first stations are provided with telephone circuits and arrangements can be made readily for assigning one telephone circuit from the central office or second station to each of the outlying buildings or first stations. Such telephone circuits ordinarily are located in cables along with conventional communication circuits. Accordingly, any signalling system that is employed should be so arranged and constructed that the signals can be transmitted without interfering with the proper operation of adjacent communication circuits and yet should be of such a nature that they will pass along any communication circuit regardless of whether it is a continuous communication circuit, a multiplexed circuit, or a circuit that includes one or more radio links.

Among the objects of this invention are: To provide for supervising at one point, such as a central office or second station, the condition of one or more devices at a remote point or a first station in a new and improved manner; to employ for this purpose a conventional telephone circuit, such as a wire circuit, a multiplexed circuit, a combination wire and radio circuit or the like, normally used for voice communication in such manner that there is no interference with communication on adjacent telephone circuits; to generate at the remote point or first station to be supervised fundamental and second harmonic frequencies, such as 440 and 880 cycles per second, in the voice range normally carried by telephone voice circuits and to apply these frequencies to the telephone circuit under the control of contacts operated on change of the operating condition of a supervised device at the remote point or first station from one condition to another condition; to provide for each device that is supervised a particular phase relation between the two frequencies;

to apply continuously to the telephone circuit one of the frequencies and to apply the other frequency in predetermined phase relationship momentarily upon the change in condition of the supervised device; at the central point or second station to receive the two frequencies from the telephone or signalling circuit and to employ them for controlling the operation of load devices, such as indicating lamps, the energization of which corresponds to the condition of the device at the remote point or first station that is being supervised; to provide a switching circuit at the central point or second station that is responsive to the polarity of the received signal resulting from the particular phase relationship of the two frequencies for controlling the energization of the load device or indicating lamp individual thereto; to provide two load devices or indicating lamps for each device being supervised with one, for example a green light, being normally energized from the other, for example a red light, being energized on change of condition of the supervised device, whereupon the green light is extinguished; to employ a transistor switching circuit responsive to the polarity of the incoming signal for controlling the energization of the signalling devices; to provide a transistor switching circuit individual to each set of indicating lamps; to provide four transistor switching circuits with two of them being responsive, respectively, to opposite polarities derived from the two frequencies when they are in phase and 180° out of phase and the other two being responsive, respectively, to opposite polarities derived from the two frequencies when they are 90° and 270° out of phase; and to provide for indicating whether the telephone circuit is intact by indicating the continuity of transmission and receipt of the frequency that is normally continuously transmitted and received.

Figures 1, 2:
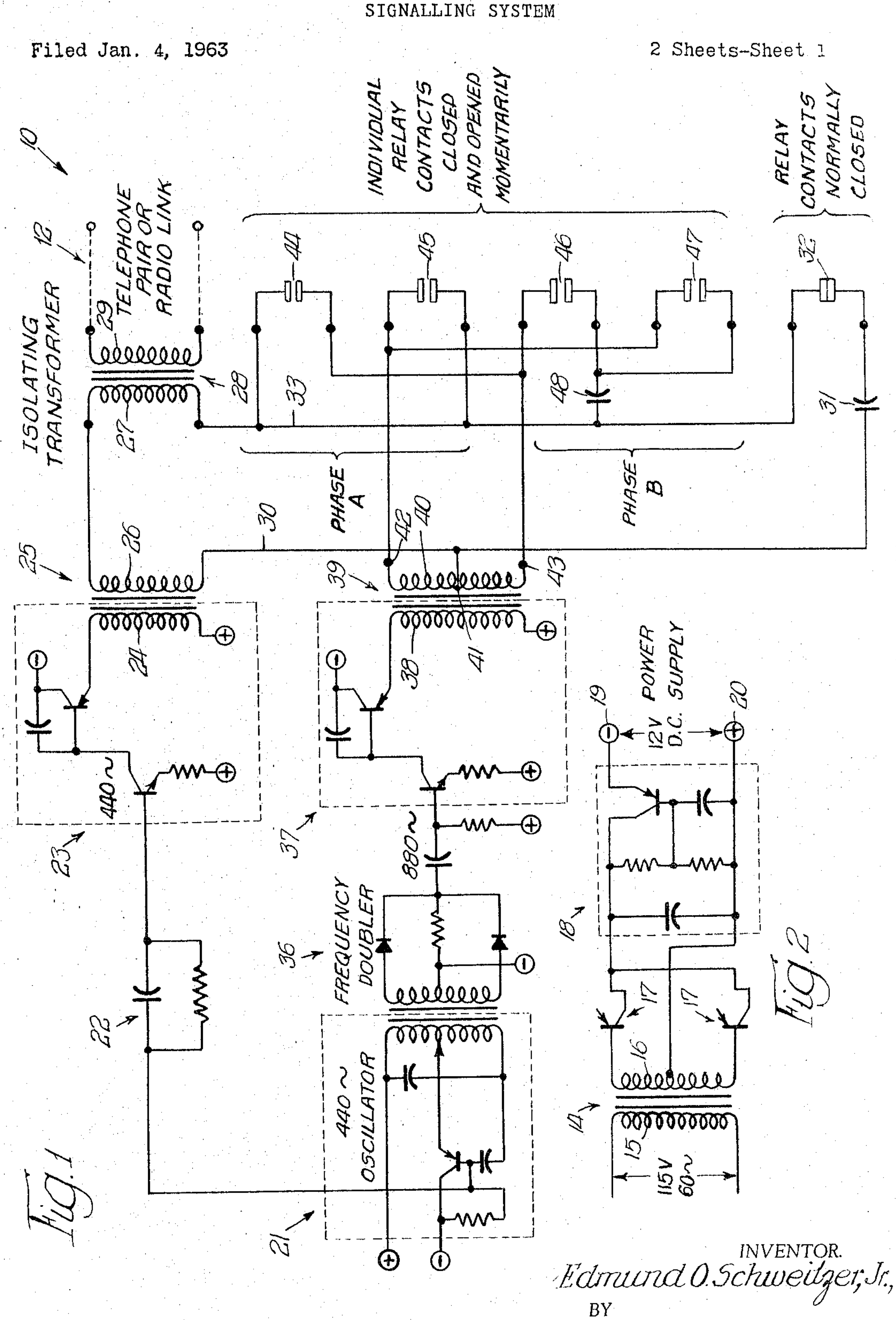
FIG. 1 shows the circuit connections that can be employed at the remote point or the first station where devices are located that are to be supervised over a telephone circuit from a central point or a second station.
FIG. 2 shows the circuit connections that can be employed to provide the power supply for energizing the circuits shown in FIG. 1.
Figures 3, 4:
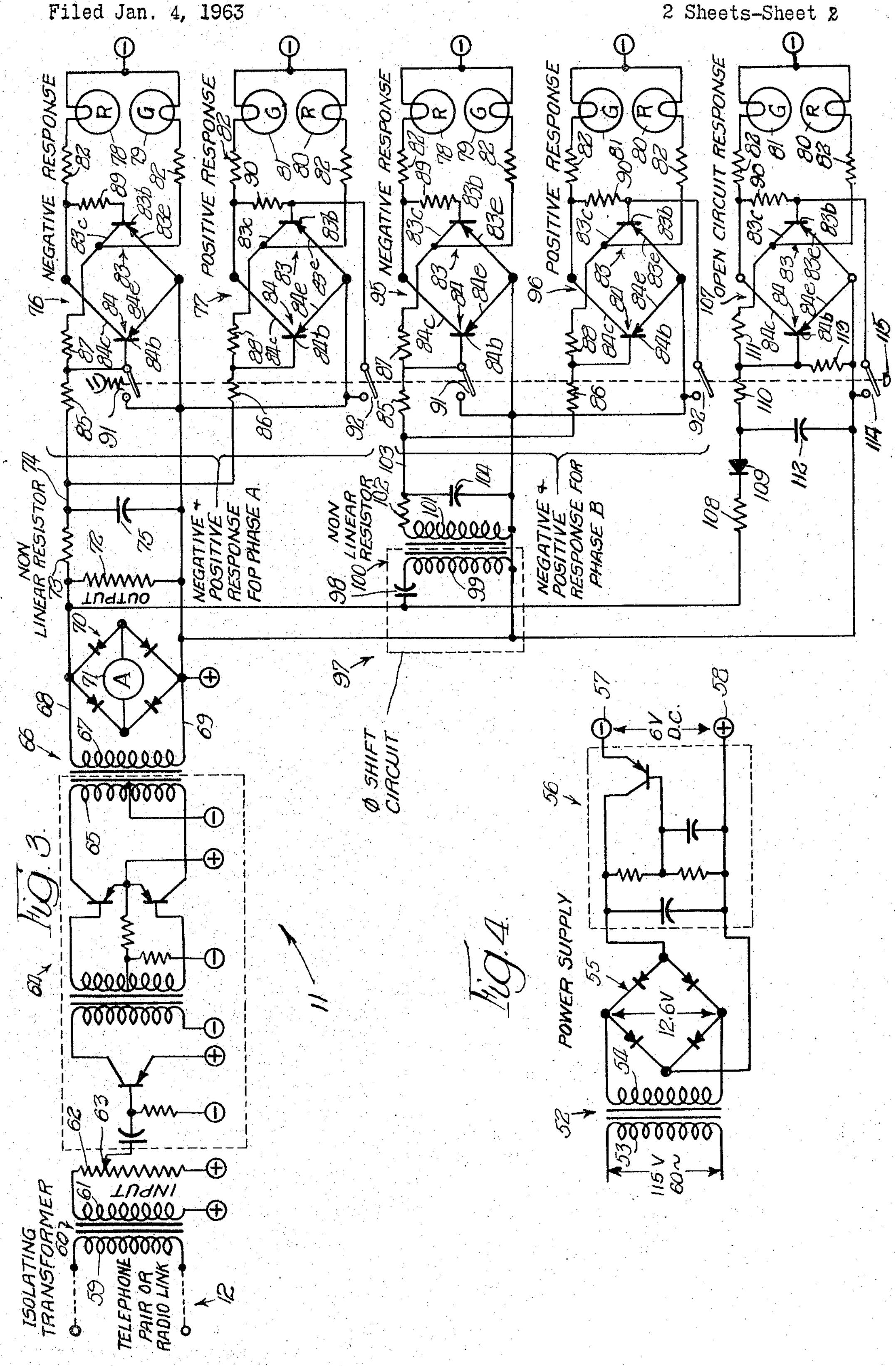
FIG. 3 shows diagrammatically the circuit connections that can be employed at the central point or second station for receiving the signals transmitted over the telephone circuit from the first station.
FIG. 4 shows diagrammatically the circuit connections that can be employed to provide the power supply for the system shown in FIG. 3.

Referring first to FIGS. 1 and 3 of the drawings it will be observed that the reference character 10 designates, generally, a first station and the reference character 11 designates, generally, a second station. The stations are interconnected by a signalling circuit that is indicated, generally, at 12. The signalling circuit 12 can be the two metallic conductors of a conventional telephone circuit. Additionally the signalling circuit can be a multiplexed circuit or it can be a telephone circuit which includes a radio link.

FIG. 2 shows the power supply circuit that can be employed to provide the necessary unidirectional voltages for the circuit connections shown in FIG. 1. Here it will be observed that a transformer 14 is provided having a primary winding 15 that is connected for energization to a conventional 115 volt 60 cycle per second alternating current source. A secondary winding 16 on the transformer 14 is connected to transistors 17—17 which are used here as rectifiers and the output of which is caused to flow through an electronic filter circuit, shown generally at 18, to energize terminals 19 and 20 which, as indicated, are indicated as being respectively negative and positive terminals with a voltage of 12 volts D.C. maintained therebetween.

Referring now to FIG. 1, the reference character 21 designates, generally, a 440 cycle oscillator of conventional construction. A portion of the output of the oscillator 21 is applied through a phase angle control circuit 22 to an amplifier 23 which includes a primary winding 24 of a transformer 25. The secondary winding 26 of the transformer 25 is connected to one terminal of a primary winding 27 of an isolating transformer 28 the secondary winding 29 of which is connected to the signalling circuit 12. The secondary winding 26 is connected through a conductor 30, capacitor 31, normally closed contacts 32 and a conductor 33 to the other terminal of the primary winding 27.

The normally closed contacts 32 can be controlled by any suitable means. For example, the contacts 32 can be arranged to be opened in the event that a window at the first station is opened in an unauthorized manner. The opening of the contacts 32 serves to remove the fundamental frequency of 440 cycles from the signalling circuit 12 and thus provides at the second station, in a manner to be described, an indication that a change in the position of a window has taken place. It will be appreciated that the same signal will be indicated should there be a failure in the power supply energizing the oscillator 21 or should there be an open circuit in the signalling circuit 12.

The oscillator 21 is arranged to have a portion of its output applied to a frequency doubler that is indicated, generally, at 36 for the purpose of generating a second harmonic or a frequency of 880 cycles per second. The double frequency is applied through an amplifier 37 which includes a primary winding 38 to a transformer 39 having a secondary winding 40. The secondary winding 40 has a center tap 41 and end terminals 42 and 43, the center tap 41 being connected to the conductor 30.

Provision is made for applying momentarily to the signalling circuit 12 the second harmonic or 880 cycle frequency in four different phase relationships with respect to the fundamental frequency of 440 cycles per second. For this purpose normally open contacts 44, 45, 46 and 47 are provided. These contacts are arranged to be operated momentarily upon the occurrence of an operation individual to each at the first station. For example, the contacts 44 can be arranged to be closed momentarily in the event that an oil burner, normally in operation, should discontinue in operation. Likewise the contacts 45 can be mounted on a relay which momentarily closes and opens them in response to the shutting down of an air conditioning system. Contacts 46 can be arranged to be closed momentarily in the event that a door is opened by unauthorized personnel. Contacts 47 can be closed momentarily in the event that a fire is detected and the alarm is sounded. It will be understood that the various operations identified with the contacts 44, 45, 46 and 47 are set forth as being illustrative of the uses to which they may be placed. Obviously they can be arranged to be closed momentarily by devices that are responsive to other functions as may be desired.

It will be noted that the contacts 44, when closed, serve to interconnect the conductor 33, connected to one terminal of the primary winding 27 of the isolating transformer 28, to end terminal 43 of the secondary winding 40 on the transformer 39. When this circuit is completed the second harmonic or 880 cycle frequency is applied to the signalling circuit 12 in 180° out of phase relationship with respect to the fundamental frequency of 440 cycles that is continuously applied thereto. As described hereinafter, the application of the two frequencies in this phase relationship provides a signal having a negative polarity at the second station which is employed for indicating at the second station that the contacts 44 have been closed momentarily and that the operation corresponding to such momentary closure has occurred.

When contacts 45 are momentarily closed, terminal 42 is connected to the conductor 33. Since the terminal 42 is at the opposite end of the secondary winding 40 the phase relationship of the second harmonic is 180° out of phase with that appearing at the end terminal 43. Stated differently, when the contacts 45 are closed momentarily the second harmonic is applied to the signalling circuit 12 in phase with the fundamental frequency. At the second station this provides a signal having a positive polarity and use is made of it to indicate at the second station that the contacts 45 have been closed momentarily to show that the condition corresponding to such closure has been completed.

In order to shift the phase of the second harmonic with respect to the fundamental through 90° and 270° a capacitor 48 is provided. On closure of contacts 46 momentarily terminal 43 of the secondary winding 40 is connected through the capacitor 48 to the conductor 33. The phase relationship between the fundamental and the second harmonic is such that the latter is 270° out of phase with the former. This provides at the second station a negative control voltage which is employed to indicate that the contacts 46 have been closed and then opened.

When contacts 47 are momentarily closed, the end terminal 42 is connected through capacitor 48 to conductor 33. When this takes place the second harmonic is 90° out of phase with the fundamental frequency as applied to the signalling circuit 12 and at the second station a positive signal is provided that is employed to indicate that the contacts 47 have been closed momentarily.

The operation incident to the momentary closure of contacts 44 and 45 is designated as phase A with contacts 44 providing a negative response and contacts 45 providing a positive response for this phase. In like manner contacts 46 and 47 are associated with phase B and contacts 46 in this phase provide a negative response at the second station while contacts 47 provide a positive response.

FIG. 4 shows the circuit connections that can be employed for providing the power supply for the system at the second station. The circuit includes a transformer 52 having a primary winding 53 that is connected for energization to a conventional 115 volt 60 cycle per second source. It is not necessary that this alternating current source be the same source that is employed for energizing the primary winding 15 of the transformer 14 shown in FIG. 2. The transformer 52 includes a secondary winding 54 the output of which is applied to a bridge type rectifier 55. The unidirectional output of the rectifier 55 is applied through an electronic filter, shown generally at 56, to energize terminals 57 and 58 that are indicated, respectively, as negative and positive terminals with a voltage of 6 volts D.C. being maintained therebetween.

Referring now to FIG. 3 it will be observed that the signalling circuit 12 terminates in a primary winding 59 of a transformer 60 which is an isolating transformer and corresponds to the isolating transformer 28 at the other end of the signalling circuit 12. The transformer 60 has a secondary winding 61 across which a potentiometer 62 is connected having an adjustable contact 63 for varying the input into a two stage amplifier that is indicated, generally, at 64. The amplifier 64 includes a primary winding 65 of a transformer 66 which has a secondary winding 67 to which conductors 68 and 69 are connected. It will be noted that conductor 69 is connected to the positive side of the 6 volt D.C. source shown in FIG. 4.

In order to measure the level of the signal from the signalling circuit 12 and to adjust the contact 63 to the desired position a bridge rectifier 70 is connected between the conductors 68 and 69 to energize a meter 71. A load resistor 72 is connected between the conductors 68 and 69.

Connected in series with the conductor 68 is a non-linear resistor 73 the purpose of which is described in detail in the patents above referred to. Depending upon the phase relationship between the fundamental and second harmonic frequencies applied to the signalling circuit 12, a negative or positive signal is applied to conductor 74 connected to the non-linear resistor 73 for the purpose of effecting certain control functions that will be described presently. The alternating current component of the current flowing through the non-linear resistor 73 is by-passed by a capacitor 75. Thus only the positive or the negative control potential is applied to the conductor 74.

It will be observed that the phase A, previously referred to, includes a negative response switching circuit that is indicated at 76 and a positive response switching circuit that is indicated at 77. These circuits are associated with contacts 44 and 45 and their operation.

In the particular circuit shown the switching circuit 76 has associated therewith a load device 78 in the form of an incandescent lamp that is provided with a red lens. Also associated therewith is a load device 79 which is another incandescent lamp having a green lens associated therewith. These different colors are indicated by the appropriate application of R and G. The filaments are commonly connected to the negative terminal of the 6 volt D.C. source shown in FIG. 4.

Similarly the switching circuit 77 is arranged to control the energization of load devices 80 and 81. A ballast resistor 82 is connected in series circuit relation with each of the load devices 78, 79, 80 and 81 in order to provide the desired resistances in the load circuits under the control of the switching circuits 76 and 77.

Except for the transposition of two control resistors, the switching circuits 76 and 77 are identical. Each includes a transistor 83 having a base **83*b*, a collector 83*c* and an emitter 83*e*. Also there is a transistor 84 which has a base 84*b*, a collector 84*c* and an emitter 84*e*. Input resistors 85 and 86 serve to interconnect the conductor 74 to which the control polarity, either positive or negative, is applied to the switching circuits 76 and 77. For illustrative purposes it is pointed out that the resistors 85 and 86 may have a resistance of 3,900 ohms. Control resistors 87 and 88 interconnect the input resistors 85 and 86 to the collectors 83*c* of the switching circuits 76 and 77 respectively. Also base resistors 89 and 90 interconnect the collectors 84*c* of the switching circuits 76 and 77 with the respective bases 83*b*. The difference in the switching circuits 76 and 77 resides in having the control resistor 87 of substantially less ohmic resistance than the base resistor 89. For example the control resistor 87 may have a resistance of 1,800 ohms while the base resistor 89 has a resistance of 3,900 ohms. The relationship between the control resistor 88 and the base resistor 90 is the same but in this instance the resistor 88 is the larger and may have a resistance of 3,900 ohms while the base resistor 90** has a resistance of 1,800 ohms.

In order to describe the operation of the switching circuits 76 and 77 comprising phase A the operation of the switching circuit 76 will be described. As a preliminary it will be assumed that the values of the resistances of resistors 87 and 89 are the same. The base **83*b* of transistor 83 receives its bias from the collector 84*c* of transistor 84 while transistor base 84*b* receives its bias from the collector 83*c* of transistor 83. Now assuming, as stated, that the resistors 87 and 89 are equal in ohmic value and the transistors 83 and 84 are identical, either load device 79 or load device 78 may be energized and in this particular case the corresponding lamp lighted. When there is a large negative bias on base 83*b* and a small negative bias on base 84*b*, load device 79 is energized. Now, if a negative voltage is applied to the input resistor 85 from conductor 74, it will cause transistor 84 to conduct and energize load device 78 while deenergizing load device 79. The corresponding lamps would be lighted and extinguished. If a positive voltage is next applied from conductor 74 to the input resistor 85, transistor 84 will cease to conduct and a negative voltage will be applied to the base 83*b* of transistor 83 through the resistor 89, ballast resistor 82 and load device 78. Transistor 83 then will become conducting and load device 79 will be energized while load device 78** is deenergized.

When the load devices 78 and 79 comprise red and green indicating lamps, it is conventional to have the green light illuminated when conditions are normal and to have it extinguished and the red light lighted when the abnormal condition occurs. Also it is desirable that this signal be maintained regardless of the application of a subsequent signal until the operator has manually reset the system after having noted the particular signal that has been shown. Moreover, since the contacts 44, 45, 46 and 47 are closed only momentarily, it is desirable that the switching circuits 76 and 77 be so arranged that, once the load device 78 has been energized, or the load device 80 has been energized, they will remain in the energized condition. For this purpose the resistors 89 and 87 have the different values above referred to as do the resistors 88 and 90. When the control resistor 89 has a value slightly more than twice the value of the control resistor 87, transistor 84, when made to conduct by application of a negative signal to the input resistor 85 as caused by the closure of contacts 44 momentarily so that the second harmonic is 180° out of phase with the fundamental frequency, the transistor 84 will hold in the conducting state with the red light corresponding to the load device 78 illuminated and the green light corresponding to the load device 79 extinguished. This condition will remain until the switching circuit 76 is reset by connecting the base **84*b* to conductor 79 which is energized at positive potential. This is done by closure of contacts 91** which is accomplished manually.

The switching circuit 77 is arranged to have a positive response which is the result of the momentary closure of contacts 45 and the application of the second harmonic in phase with the fundamental frequency. For the switching circuit 77 the control resistor 88 has an ohmic value that is slightly greater than twice the ohmic value of the base resistor 90. Now when the transistor 83 of switching circuit 77 is made to conduct by application of a positive signal to conductor 74 in the manner described and to the input resistor 86, the transistor 83 will hold in the conducting state until it is reset by connecting its base **83*b* to the positive conductor 69. This is accomplished by contacts 92**.

Phase B, which includes switching circuits 95 and 96, is identical with phase A insofar as the circuit connections are shown and load devices used. Accordingly, the description will not be repeated.

In order to arrange for the switching circuits 95 and 96 and associated load devices to be responsive to phase B which involves the 90° and 270° phase relationships of the fundamental and second harmonic frequencies, a phase shifting circuit 97 is employed and, as shown, it is connected for energization to conductors 68 and 69. The phase shifting circuit 97 includes a capacitor 98 and a primary winding 99 of a transformer 100 which has a secondary winding 101 that is connected through a non-linear resistor 102 to a conductor 103. A by-pass capacitor 104 serves to shunt the alternating current component of the current flow through the non-linear resistor 102.

Switching circuit 107 and associated equipment is provided to indicate that the fundamental frequency has been interrupted. This may be caused by a failure at first station or by a failure of some intermediate circuit including the signalling circuit 12. Also, this may be caused by intentional opening of contacts 32 in response to some operation with respect to which a signal is to be provided at the second station.

It will be observed that the switching circuit 107 is identical with the switching circuits 77 and 96. Thus it is unnecessary to describe it in detail. It is controlled in a somewhat different fashion. For this purpose a resistor 108 is connected in the circuit from the conductors 68 and 69 and a diode rectifier 109 is provided so as to apply a negative voltage through resistor 110 and 111 to collector 83*c* of transistor 83, the resistor 111 having the same ohmic resistance as the resistor 88. A filter capacitor 112 is connected between the common connection between the diode rectifier 109 and resistor 110 and the conductor that is connected to conductor 69. A resistor 113 interconnects this conductor and base 84*b*. It may have a value of 600 ohms.

As long as the fundamental frequency of 440 cycles per second continues to be applied to the signalling circuit 12, the rectifier 109 applies a negative bias to the base 84*b*. Transistor 84 is conducting and the load device 81 is energized. This load device is the green light and, as long as it is illuminated, it indicates that the system is functioning normally. Under these circumstances the load device 80 is not energized since insufficient negative bias is applied to the base 83*b*.

When the fundamental frequency ceases to be applied for any reason to the diode rectifier 109, it no longer applies negative bias to the filter capacitor 112 and to the base 84*b* of the transistor 84. Then a positive voltage is applied through resistor 113 to the base 84*b* and the transistor 84 ceases to conduct. Load device 81 ceases to be energized and the green light is extinguished. Thereupon a negative potential develops at the junction of the ballast resistor 82 and the base resistor 90 through the load device 81. A negative biasing voltage is then applied to the base 83*b* of the transistor 83 and it is rendered conducting and effects the energization of the load device 80 which in this case involves the illumination of the red lamp. The current for energizing the load device 80 flows from the conductor 69 through emitter 83*e*, collector 83*c*, ballast resistor 82 and load device 80 to the negative terminal of the 6 volt D.C. source.

In order to reset the switching circuit 107 reset contacts 114 are provided for connecting the base 83*b* to the positive conductor 69.

It is desirable to provide for resetting all of the load devices that may have been operated by employing a single control. For this purpose a push button 115 is arranged, as indicated, to be mechanically connected to the reset contacts 91—91, 92—92 and 114. In this manner, if any of the load devices 78, 79, 80 and 81 have been energized or deenergized as the case may be to indicate that some or all of the contacts 32, 44, 45, 46 and 47 have been operated from the normal closed or open positions, the particular load device or devices which indicate such operation can be manually reset.

While it is contemplated that a different signalling circuit 12 will be used between each first station, shown in FIG. 1, and the equipment at the second station shown in FIG. 3, it will be understood that a signalling circuit can be employed that is common to several first stations. In such case where the signalling circuit 12 is common to several first stations, different combinations of frequencies are employed. For example, a fundamental frequency of 550 cycles and its second harmonic 1100 cycles can be used for a second remote station. In like manner a fundamental frequency of 700 cycles per second and its second harmonic of 1400 cycles can be used. Likewise a fundamental frequency of 900 cycles per second and its second harmonic of 1800 cycles can be used. All of these frequencies are in the voice range and in the band of frequencies for which telephone communication circuits are designed to operate. Thus the length of the signalling circuit 12 does not enter into the operation of the signalling system since it is conventional to employ amplfiers at various locations along a telephone circuit for maintaining the level of transmission within the necessary range.

Although the fundamental frequency is continuously applied to the signalling circuit 12 when the system described herein is employed, it is possible to use the signallng circuit 12 for voice communication at the same tme. If the fundamental frequency interferes with the voice communication, it can be filtered out. However, it is not objectionable and the circuit can be employed for voice communication even in the presence of the fundamental frequency and its application to the ears of the parties using the signalling circuit 12 for voice communication.

What is claimed as new is:

1. A system for signalling from a first station to a second station interconnected by a signalling circuit comprising:
- (a) at the first station:
  - (1) means for generating two frequencies one of which is a harmonic of the other and for applythem to said signalling circuit, and
  - (2) means for shifting the phase of one of said frequencies with respect to the phase of the other frequency; and
- (b) at the second station:
  - (1) circuit means including non-linear resistance means connected to said signalling circuit whereby across said circuit means a unidirectional control voltage appears the magnitude and polarity of which correspond to the phase relation between said frequencies,
  - (2) a load device, and
  - (3) switching means connected to said circuit means and responsive to said unidirectional voltage for controlling the energization of said load device in accordance with the phase relation between said frequencies.

2. The invention, as set forth in claim 1, wherein:
- (a) a pair of load devices is provided at the second station, and
- (b) the switching means effects energization of one or the other of said load devices depending upon the phase relation of the frequencies.

3. The invention, as set forth in claim 1, wherein:
- (a) at the first station means are provided for selectively applying to the signalling circuit the frequencies in one phase relationship and in another phase relationship, and
- (b) at the second station:
  - (1) a pair of load devices is provided, and
  - (2) the switching means includes switching means individual to each load device, one load device being responsive only to the unidirectional voltage corresponding to the one phase relationship of the frequencies and the other load device being responsive to the unidirectional voltage corresponding to the other phase relationship of the frequencies.

4. The invention, as set forth in claim 3, wherein the phase relationships are 180° apart.

5. A system for signalling from a first station to a second station interconnected by a signalling circuit comprising:
- (a) at the first station:
  - (1) means for generating two frequencies one of which is a harmonic of the other and for applying them to said signalling circuit, and
  - (2) means for shifting the phase of one of said frequencies with respect to the phase of the other frequency in any of four phase relationships 90° apart; and
- (b) at the second station:
  - (1) circuit means including first non-linear resistance means connected to said signalling circuit whereby across said circuit means a unidirectional control voltage appears the magnitude and polarity of which correspond to the phase relation between said frequencies and a phase shift circuit and a second non-linear resistance means,
(2) two pairs of load devices each individual to one of said four phase relationships, and
(3) two pairs of switching means connected to said circuit means, one pair being individual to one pair of load devices, and the other pair being individual to the other pair of load devices, each switching means and thereby its load device being responsive only to the unidirectional voltage corresponding to the phase relationship individual thereto.

6. A system for signalling from a first station to a second station interconnected by a signalling circuit comprising:

(a) at the first station:
(1) means for generating two frequencies one of which is a harmonic of the other and for applying them to said signalling circuit, and
(2) means for shifting the phase of one of said frequencies with respect to the phase of the other frequency; and (b) at the second station:
(1) circuit means including non-linear resistance means connected to said signalling circuit whereby across said circuit means a unidirectional control voltage appears the magnitude and polarity of which correspond to the phase relation between said frequencies,
(2) a pair of load devices, and
(3) switching means connected to said circuit means and responsive to said unidirectional voltage for controlling the energization of one or the other of said load devices in accordance with the phase relation between said frequencies, (c) means commonly connecting one terminal of each load device to the negative terminal of a direct current source, (d) said switching means include:
(1) a pair of transistors each having
(a) a collector individual to another terminal of each load device,
(b) an emitter connected to the positive terminal of the direct current source, and
(c) a base, and
(2) a resistor interconnecting each base and the collector of the other transistor,
(3) the unidirectional control voltage is applied between said emitters and the base of one of said transistors to cause energizing current to flow through one or the other of said load devices depending upon the polarity of said control voltage.

7. A system for signalling from a first station to a second station interconnected by a signalling circuit comprising:

(a) at the first station:
(1) means for generating two frequencies one of which is a harmonic of the other and for applying them to said signalling circuit, one of said frequencies being continuously applied to said signalling circuit, and
(2) means for shifting the phase of one of said frequencies with respect to the phase of the other frequency; and (b) at the second station:
(1) circuit means including non-linear resistance means connected to said signalling circuit whereby across said circuit means a unidirectional control voltage appears the magnitude and polarity of which correspond to the phase relation between said frequencies,
(2) a load device,
(3) switching means connected to said circuit means and responsive to said unidirectional voltage for controlling the energization of said load device in accordance with the phase relation between said frequencies,
(4) an open signalling circuit responsive load device,
(5) switching means for controlling the energization of said open signalling circuit responsive load device, and
(6) circuit means including rectifier means interconnecting the last mentioned switching means and said signalling circuit whereby said open signalling circuit responsive load device is maintained in unenergized condition as long as said one frequency is applied to said last mentioned switching means and is energized upon cessation of said one frequency.

8. The invention, as set forth in claim 6, wherein one of the resistors has a substantially greater ohmic value than the other whereby once energizing current is caused to flow through one of the load devices the subsequent application of the control voltage is ineffective to change the energized condition of the one load device.

9. The invention, as set forth in claim 8, wherein means selectively connect the base of the trasistor connected to the lower ohmic value resistor to the positive terminal of the direct current source to discontinue the flow of energizing current through the one load device and cause energizing current to flow through the other load device.

References Cited by the Examiner

UNITED STATES PATENTS

| | | | |
|---|---|---|---|
| 1,709,067 | 4/1929 | Field | 340—163 |
| 2,402,973 | 7/1946 | Moore | 340—207 |
| 2,479,020 | 8/1949 | Pelmulder | 340—170 |
| 2,542,627 | 2/1951 | Chevallier | 340—170 X |

NEIL C. READ, *Primary Examiner.*

THOMAS B. HABECKER, *Examiner.*

P. XIARHOS, D. YUSKO, *Assistant Examiners.*